(12) United States Patent
Post et al.

(10) Patent No.: US 8,516,219 B2
(45) Date of Patent: *Aug. 20, 2013

(54) INDEX CACHE TREE

(75) Inventors: Daniel Jeffrey Post, Campbell, CA (US); Nir Jacob Wakrat, Los Altos, CA (US); Vadim Khmelnitsky, Foster City, CA (US)

(73) Assignee: Apple Inc., Cupertino, CA (US)

(*) Notice: Subject to any disclaimer, the term of this patent is extended or adjusted under 35 U.S.C. 154(b) by 947 days.

This patent is subject to a terminal disclaimer.

(21) Appl. No.: 12/509,267

(22) Filed: Jul. 24, 2009

(65) Prior Publication Data

US 2011/0022819 A1    Jan. 27, 2011

(51) Int. Cl.
*G06F 12/00* (2006.01)

(52) U.S. Cl.
USPC .......................................... 711/203; 711/173

(58) Field of Classification Search
USPC .......................................... 711/103, 172, 203
See application file for complete search history.

(56) References Cited

U.S. PATENT DOCUMENTS

| | | | |
|---|---|---|---|
| 4,323,987 A | 4/1982 | Holtz et al. | |
| 5,341,330 A | 8/1994 | Wells et al. | |
| 5,689,704 A | 11/1997 | Yoshida et al. | |
| 5,950,013 A | 9/1999 | Yoshimura | |
| 6,188,650 B1 | 2/2001 | Hamada et al. | |
| 6,199,076 B1 | 3/2001 | Logan et al. | |
| 6,263,453 B1 | 7/2001 | Anderson | |
| 6,282,624 B1 | 8/2001 | Kimura et al. | |
| 6,388,961 B1 | 5/2002 | Ijichi | |
| 6,427,186 B1 | 7/2002 | Lin et al. | |
| 6,832,293 B1 | 12/2004 | Tagawa et al. | |
| 7,099,239 B2 | 8/2006 | Ogikubo | |
| 7,139,937 B1 | 11/2006 | Kilbourne et al. | |
| 7,234,024 B1 | 6/2007 | Kiselev | |
| 7,412,558 B2 | 8/2008 | Oribe et al. | |
| 2003/0061189 A1 | 3/2003 | Baskins et al. | |
| 2003/0093610 A1 | 5/2003 | Lai et al. | |
| 2004/0186946 A1 | 9/2004 | Lee | |
| 2005/0015378 A1 | 1/2005 | Gammel et al. | |
| 2005/0251617 A1 | 11/2005 | Sinclair et al. | |
| 2006/0008256 A1 | 1/2006 | Khedouri et al. | |
| 2007/0011445 A1 | 1/2007 | Waltermann et al. | |

(Continued)

FOREIGN PATENT DOCUMENTS

| | | |
|---|---|---|
| WO | WO 94/20906 | 9/1994 |
| WO | WO 2009/100031 | 8/2009 |

OTHER PUBLICATIONS

International Search Report/Written Opinion in PCT/US2010/42696 mailed Sep. 14, 2010, 8 pages.

(Continued)

*Primary Examiner* — Reba I Elmore
(74) *Attorney, Agent, or Firm* — Meyertons, Hood, Kivlin, Kowert & Goetzel PC

(57) ABSTRACT

Memory mapping techniques for non-volatile memory are disclosed where logical sectors are mapped into physical pages using data structures in volatile and non-volatile memory. In some implementations, a first lookup table in non-volatile memory maps logical sectors directly into physical pages. A second lookup table in volatile memory holds the location of the first lookup table in non-volatile memory. An index cache tree in volatile memory holds the physical addresses of the most recently written or accessed logical sectors in a compressed format.

21 Claims, 10 Drawing Sheets

(56) References Cited

U.S. PATENT DOCUMENTS

| | | |
|---|---|---|
| 2007/0016721 A1 | 1/2007 | Gay |
| 2007/0073764 A1 | 3/2007 | Oks et al. |
| 2007/0124531 A1 | 5/2007 | Nishihara |
| 2007/0130441 A1 | 6/2007 | Wooten |
| 2007/0204128 A1 | 8/2007 | Lee et al. |
| 2007/0300037 A1 | 12/2007 | Rogers et al. |
| 2008/0104308 A1 | 5/2008 | Mo et al. |
| 2008/0177937 A1 | 7/2008 | Nishihara et al. |
| 2008/0189452 A1 | 8/2008 | Merry, Jr. |
| 2008/0263061 A1* | 10/2008 | Nath et al. .......... 707/100 |
| 2008/0263114 A1* | 10/2008 | Nath et al. .......... 707/206 |
| 2009/0083478 A1 | 3/2009 | Kunimatsu et al. |
| 2009/0150641 A1 | 6/2009 | Flynn et al. |
| 2009/0182962 A1 | 7/2009 | Khmelnitsky et al. |
| 2009/0198902 A1* | 8/2009 | Khmelnitsky et al. ........ 711/135 |
| 2009/0198947 A1* | 8/2009 | Khmelnitsky et al. ........ 711/202 |
| 2009/0198952 A1* | 8/2009 | Khmelnitsky et al. ........ 711/206 |
| 2009/0307409 A1 | 12/2009 | Rogers et al. |
| 2010/0287329 A1* | 11/2010 | Toelkes et al. ................ 711/103 |

OTHER PUBLICATIONS

Extended European Search Report in EP 10 17 0700 mailed Nov. 29, 2010, 7 pages.

International Search Report and Written Opinion for Application No. PCT/US2010/42707, dated Jul. 21, 2010, 9 pages.

International Search Report and Written Opinion, dated Jul. 9, 2009, issued in International Application No. PCT/US2009/032886, 20 pages.

Invitation to Pay Additional Fees and Partial International Search Report, dated May 14, 2009, issued in International Application No. PCT/US2009/032886, 10 pages.

Wakrat et al., "Restore Index Page", U.S. Appl. No. 12/509,071, filed Jul. 24, 2009.

Rogers, et al., "Device Memory Management", U.S. Appl. No. 12/134,998, filed Jun. 6, 2008.

* cited by examiner

INDEX CACHE TREE

TECHNICAL FIELD

This subject matter is generally related to memory mapping.

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate. Unfortunately, flash suffers from two limitations. First, bits can only be cleared by erasing a large block of memory. Second, each block can only sustain a limited number of erasures, after which it can no longer reliably store data. Due to these limitations, complex data structures and algorithms are often required to effectively use flash memories. These algorithms and data structures are used to support efficient not-in-place updates of data, reduce the number of erasures, and level the wear of the blocks in the device.

Flash memories do not support in-place updates or rewrites to physical memory pages unless the block containing the page is erased first. To overcome this deficiency, a hardware and/or software layer is often added to the flash subsystem. This layer, often referred to as a flash translation layer (FTL), along with the flash memory can mimic a secondary storage device by mapping logical sectors to physical memory pages. For many flash based devices, the FTL is implemented as a controller in hardware. The controller can include a processor or microcontroller along with small amounts of volatile memory (e.g., RAM). The controller can be responsible for translating a read/write request from the file system (e.g., a logical sector) into a read/write operation on a specific block of flash.

To access the physical memory pages, the controller can attempt to resolve the mapping of logical sectors to physical memory pages.

SUMMARY

A memory mapping technique for non-volatile memory is disclosed where logical sectors are mapped into physical pages using data structures in volatile and non-volatile memory. In some implementations, a first lookup table in non-volatile memory maps logical sectors directly into physical pages. A second lookup table in volatile memory holds the location of the first lookup table in non-volatile memory. An index cache tree in volatile memory holds the physical addresses of the most recently written or accessed logical sectors in a compressed format.

The disclosed memory mapping techniques provide several advantages over conventional flash memory block mapping techniques. Some of these advantages include but are not limited to: 1) eliminating the need for block mapping by directly mapping logical sectors to physical pages, 2) eliminating the need for allocating new blocks until all pages in a current block are allocated, 3) eliminating the need for allocating different journaling blocks for different logical areas, and 4) eliminating the need for triggering a garbage collection operation until all pages in the current block are allocated. Additional advantages associated with using the disclosed index cache tree data structure in volatile memory can include but are not limited to: 1) increasing a number of logical sectors that are mapped to physical addresses in volatile memory, and 2) decreasing that average time it takes the controller to resolve a logical sector to a physical address.

DETAILED DESCRIPTION

System Overview

Figure 1A:
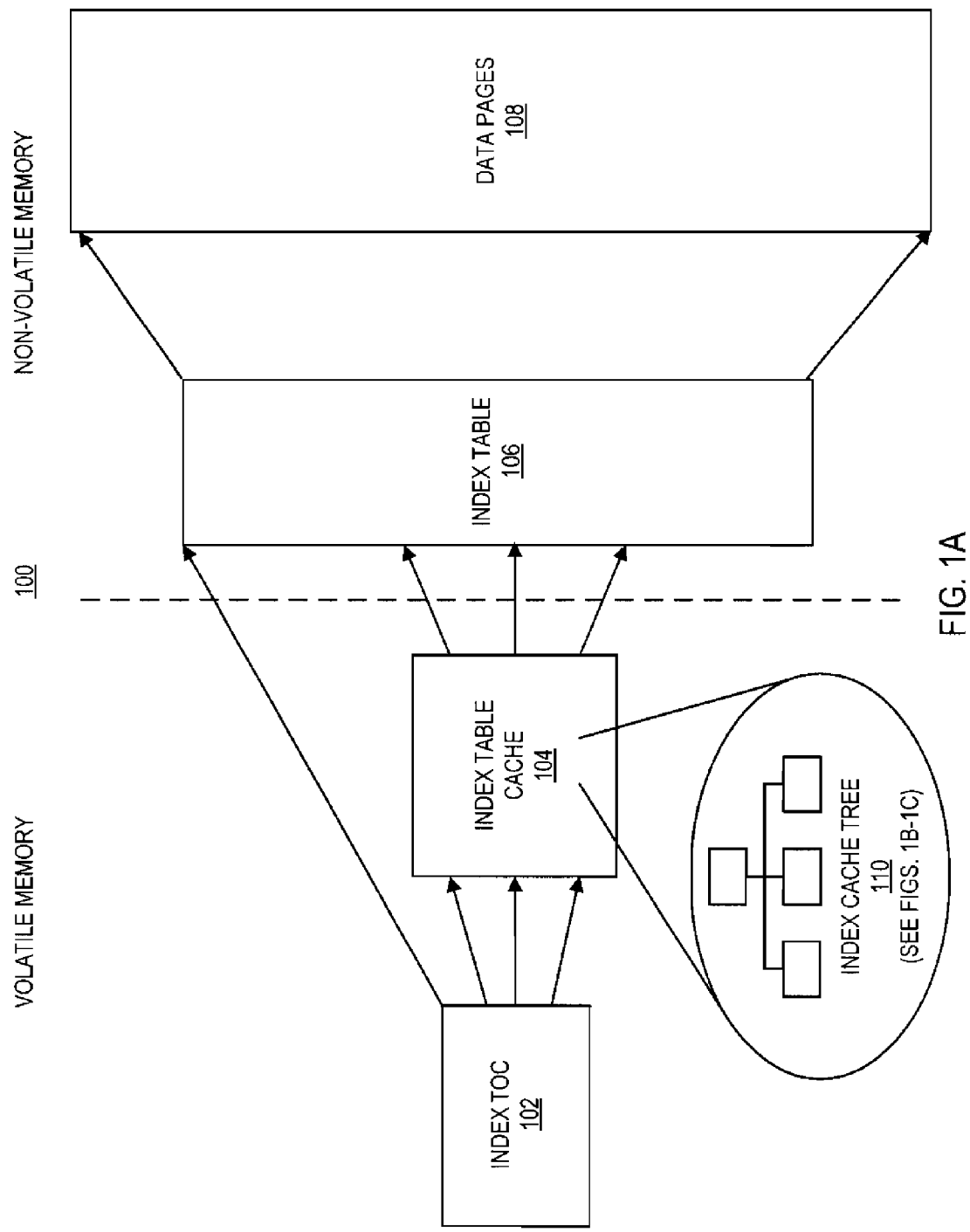
FIG. 1A is a block diagram illustrating an example memory mapping architecture for mapping logical sectors into physical pages using a lookup table and an index cache tree.

FIG. 1A is a block diagram illustrating an example memory mapping architecture 100 for mapping logical sectors into physical pages using a lookup table and an index cache tree. In some implementations, a lookup table 102 in volatile memory (e.g., RAM) holds the location (e.g., physical address) of a lookup table 106 in non-volatile memory (e.g., flash memory). The lookup table 106 holds the physical addresses of data pages 108. In some implementations, a cache 104 in volatile memory holds the physical addresses of recently written, read, or accessed logical sectors to allow faster readout. In the example shown, the lookup table 102 is also referred to as a index TOC 102, the lookup table 106 is also referred to as the index table 106 or index page, and the cache 104 is also referred to as the index table cache 104.

In the architecture 100, the index TOC 102 and the index table cache 104 enable at least a portion of the index table 106 to be stored in the non-volatile memory. This is advantageous since the small amount of RAM that is typically available in controllers cannot be scaled due to a rise in cost, area and power consumption of the controller. In some implementations, the volatile memory can be dynamically configured based on its availability or other trigger events and/or operational modes.

Data Structure Used in the Index Cache Table 104

As depicted in the example architecture 100, the index cache table 104 includes an index cache tree data structure 110. In the example shown, the index cache tree data structure 110 is also referred to as the index cache tree 110.

The index cache tree 110 uses a tree structure (e.g., a b-tree, a b*-tree, etc.) to decrease the retrieval time for entries within the index table cache 104. By using a data structure that enables efficient searching (e.g., binary search, etc.) of entries contained in the index table cache 104, increased speed can be gained when determining whether a desired logical to physical address mapping is contained within the index table cache 104. The more quickly a determination as to whether a logical to physical address mapping is contained within the index table cache 104, the sooner a flash memory device employing the architecture 100 can either use the mapping to initiate retrieval of the identified physical memory. This is advantageous since a flash memory device may consult the index table cache 104 frequently (e.g., during read operations) when attempting to resolve a logical to physical address mapping.

The index cache tree 110 can also use data compression to increase the storage capacity of the index cache table 104. By increasing the capacity of the index table cache 104 to store logical to physical address mappings, a flash memory device employing the architecture 100 will more frequently locate a desired mapping within the index cache table 104 and less frequently have to initiate retrieval of a desired mapping from the index table 106 in non-volatile memory. This is advantageous since retrieval from the index table cache 104 in volatile memory will generally be faster than retrieval from the index table 106 in non-volatile memory.

Example Index Cache Trees

Figure 1B:
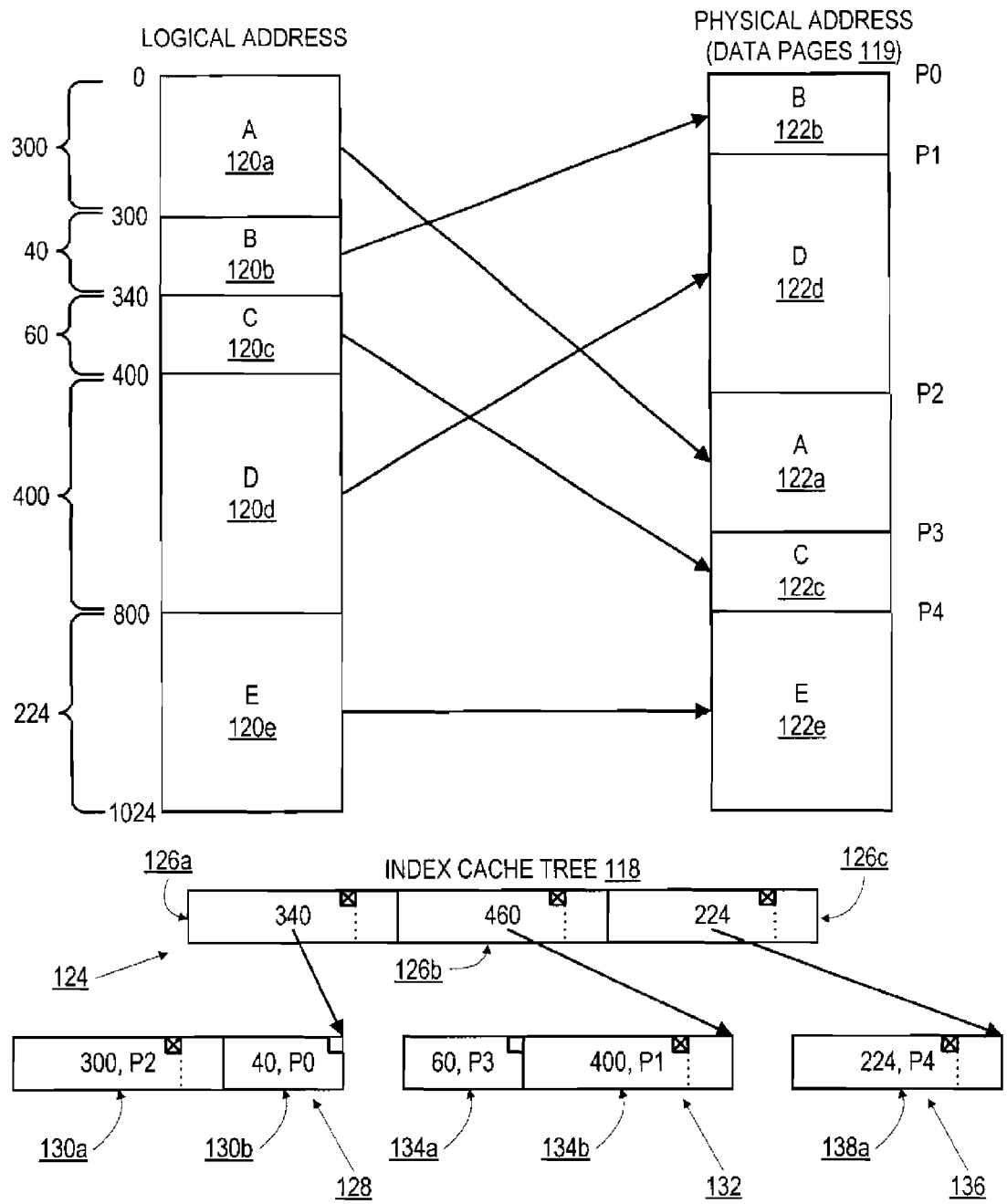
FIGS. 1B-1C are block diagrams illustrating example mappings of logical sectors directly into physical data pages using an example index cache tree.

FIG. 1B is a block diagram illustrating an example mapping of logical sectors directly into physical data pages 119 using an example index cache tree 118. The index cache tree 118 is similar to the index cache tree 110 and the data pages 119 are similar to the data pages 108, as described above with regard to FIG. 1A. In the depicted example, the index cache tree 118 has a tree structure that uses two levels of data compression. The first level of data compression corresponds to run-length encoding and the second level of data compression corresponds to a flag designating a size for each entry in the tree. The entry size can correspond to a number of bits allocated to the run-length encoding span. As a run-length encoding span increases in size, a number of bits allocated to the run-length encoding span can increase. For example, a span of 100 logical addresses can be allocated a smaller number of run-length encoding bits than a span of 100,000 logical addresses. A flag can indicate which of a fixed number of predetermined sizes correspond to each entry. For instance, if a device generally stores small files (e.g., text files, configuration files, etc.) and large files (e.g., audio files, video files, etc.), the flag can indicate which of two fixed sizes (e.g., 4-bits and 6-bits) are used for run-length encoding each entry. Any number of predetermined entry sizes (e.g., two sizes, four sizes, eight sizes, ten sizes, etc.) can be used within the tree and indicated by the flag. In some implementations, variable-sized entries for storing a physical address and/or pointer fields can be used.

In this depicted example, the data files A-E 120*a-e* are illustrated as corresponding to logical addresses. For example, data file B 120*b* is depicted as corresponding to address 300. The size of each of the data files, A-E 120*a-e*, is shown by the numbered spans to the left of the data files A-E 120*a-e*. For instance, the data file D 120*d* has a logical address span of 400.

The data files A-E 120*a-e* correspond to physical locations in the data pages 119, as depicted by physical data files A-E 122*a-e*. Each of these physical data files A-E 122*a-e* has a corresponding physical address P0-P4. For example, the physical data file A 122*a* has the physical address P2.

Index cache tree 118 maps the logical addresses to the physical addresses using tree of nodes 124, 128, 132, and 136. Each of the nodes 124, 128, 132, and 136 contains at least one of the entries 126*a-c*, 130*a-b*, 134*a-b*, and 138*a*. The entries are populated with logical address spans for each of the data files A-E 120*a-e* and either a pointer to another node or a physical address for a corresponding physical data file A-E 122*a-e*. For instance, the entry 130*a* corresponding to data file A 120*a* contains the logical address span 300 and the physical address P2 of the physical data file A 122*a*.

The nodes 124, 128, 132, and 136 and the entries 126*a-c*, 130*a-b*, 134*a-b*, and 138*a* are organized according to a logical address offset for each entry. A logical address offset can be the difference between the logical address of an entry and the first logical address. In the present example, the logical address offset is the same as the logical address itself because the first logical address is zero. However, were the first logical address to be 100 (e.g., logical address for file A 120*a* is 100), then the logical offset would be the logical address minus 100 (e.g., for file B 120*b* the logical offset would be 200 (300−100=200)).

In the present example, the nodes 124, 128, 132, and 136 and the entries 126*a-c*, 130*a-b*, 134*a-b*, and 138*a* are arranged left-to-right from the smallest logical address offset to the greatest logical address offset. For instance, since the entry 130*a* corresponds to data file A 120*a* (having logical address 0) and the entry 130*b* corresponds to the data file B 120*b* (having logical address 300), the entry 130*a* is arranged to the left of the entry 130*b*.

Entries that contain a pointer to another node (e.g., entries 126*a-c*) can store an aggregate logical address span for the entries contained within the pointed to node (and the pointed to nodes children). For instance, the entry 126*a* has a logical address span of 340, which is the aggregate value of the logical address spans for 130*a-b* (300+40=340).

The logical address offset for a data file (e.g., data files A-E 120*a-e*) can be used to locate the physical address for the data file. To identify the entry in the index cache tree 118 that contains the corresponding physical address, the logical address spans stored in the entries 126*a-c*, 130*a-b*, 134*a-b*, and 138*a* are aggregated as the nodes 124, 128, 132, and 136 are traversed. As the entries of index cache tree 118 are individually examined, the aggregated value (e.g., a tally) serves as the logical address offset for the entry that is currently being evaluated. The tally is initialized at zero and traversal of the index cache tree 118 can begin with the first entry 126*a* (e.g., the entry with the smallest logical address offset) of the root node 124. If the logical address offset at issue (e.g., logical address for which a physical address is sought) is greater than or equal to the tally plus the logical address span of the entry being evaluated, then the logical address span of the entry is added to the tally and the next entry in the node is evaluated.

If the logical address offset is less than the tally plus the logical address span of the entry being evaluated, then the entry being evaluated corresponds to the logical address offset at issue. In such a case, if the entry being evaluated stores a pointer to another node, then evaluation shifts to the first entry of the pointed to node. If the entry being evaluated stores a physical address, then evaluation can end because the corresponding physical address has been located.

For instance, if the physical address for the data file D 120*d* is sought, the following steps would be taken:

Step 1: Receive logical address offset for data file D 120*d* (logical address offset=400) and initialize tally=0

Step 2: Is logical address span of entry 126a (340)+tally (0)<=logical address offset (400)? Yes, add logical address span of entry 126a to tally (340=0+340)

Step 3: Is logical address span of entry 126b (460)+tally (340)<=logical address offset (400)? No, follow pointer of entry 126b to node 132

Step 4: Is logical address span of entry 134a (60)+tally (340)<=logical address offset (400)? Yes, add logical address span of entry 134a to tally (400=340+60)

Step 5: Is logical address span of entry 134b (400)+tally (400)<=logical address offset (400)? No, retrieve physical address (P1) stored in entry 134b—corresponding physical address located By storing the logical address span instead of the logical address itself, each entry in the index cache tree 118 is compressed. The logical address span will generally be a fraction of the size of the logical address, allowing fewer bits to be allocated. As such, the index table cache 104 can store a greater number of entries using the index cache tree 118, which can in-turn improve the speed by which memory accesses are processed and create greater efficiency within a flash memory device.

The description above regarding using the logical address span corresponds to the first level of data compression within the index cache tree 118. The second level of data compression regards a flag contained in each entry that indicates a length type for the entry. In the example index cache tree 118, the flag (represented by the box in the upper-right corner of each entry) indicates whether an entry is a short entry (e.g., 1 byte, 2 bytes, 4 bytes, 6 bytes, etc.) or a long entry (e.g., 2 bytes, 4 bytes, 6 bytes, 8 bytes, 10 bytes, 16 bytes, 32 bytes, etc.). The entries having an "X" (entries 126a-c, 130a, 134b, and 138a) are designated as long entries. The dashed line is intended to illustrate the additional bit-length for the long entries. The example above is provided for illustrative purposes. Any number of entry lengths can be used (e.g., two, four, six, eight, sixteen, etc.)—the number of entry lengths is not limited to two entry lengths (short and long entries).

The length type for an entry can be based upon a variety of factors, such as a bit-length for a logical address span and/or whether the entry stores a pointer or a physical address. In the present example, the determination as to whether an entry is a short or long entry corresponds to the length of logical address span. For illustrative purposes, the entries storing three digit logical address spans (e.g., logical address span 300 for entry 130a) are designated as long with an "X," and the entries storing two digit logical address spans (e.g., logical address span 40 for entry 130b) are designated as short by an empty box.

Additionally, the number of bits for each length type and the number of length types (e.g., two types—short and long; four types—short, medium-short, medium-long, long) can vary depending on a variety of factors. Such factors can include an intended use for the flash memory device (e.g., portable media player, thumb drive, smart phone, embedded device, etc.), usage statistics for the device (e.g., file type accessed most frequently, common file lengths, etc.), available space in the index table cache 104 for the index cache tree 118, etc. For example, a smart phone that stores contact information, emails, text messages, and media files may be configured to have four length types that are tailored to these four common types of files.

The number of bits for each length type and/or the number of length types can additionally vary over the lifetime of a device. For example, on power-up the device may evaluate usage statistics for the device to determine whether an adjustment to the present scheme should be made.

Use of the flag indicated length types for entries in the index cache tree 118 provides an additional level of compression that can enable the index table cache 104 to store more of the index table 106 from non-volatile memory. As articulated above, the more entries that are stored within the index table cache 104, the faster the flash memory device will be able to obtain the physical address on average. Additionally, bit usage efficiency can be increased. For instance, by using a flag to indicate the length, the occurrence of unused bits is minimized (e.g., the extra bits associated with a long entry are only allocated when needed) with a minimal number of bits being dedicated to identifying a length for each entry.

Figure 1C:
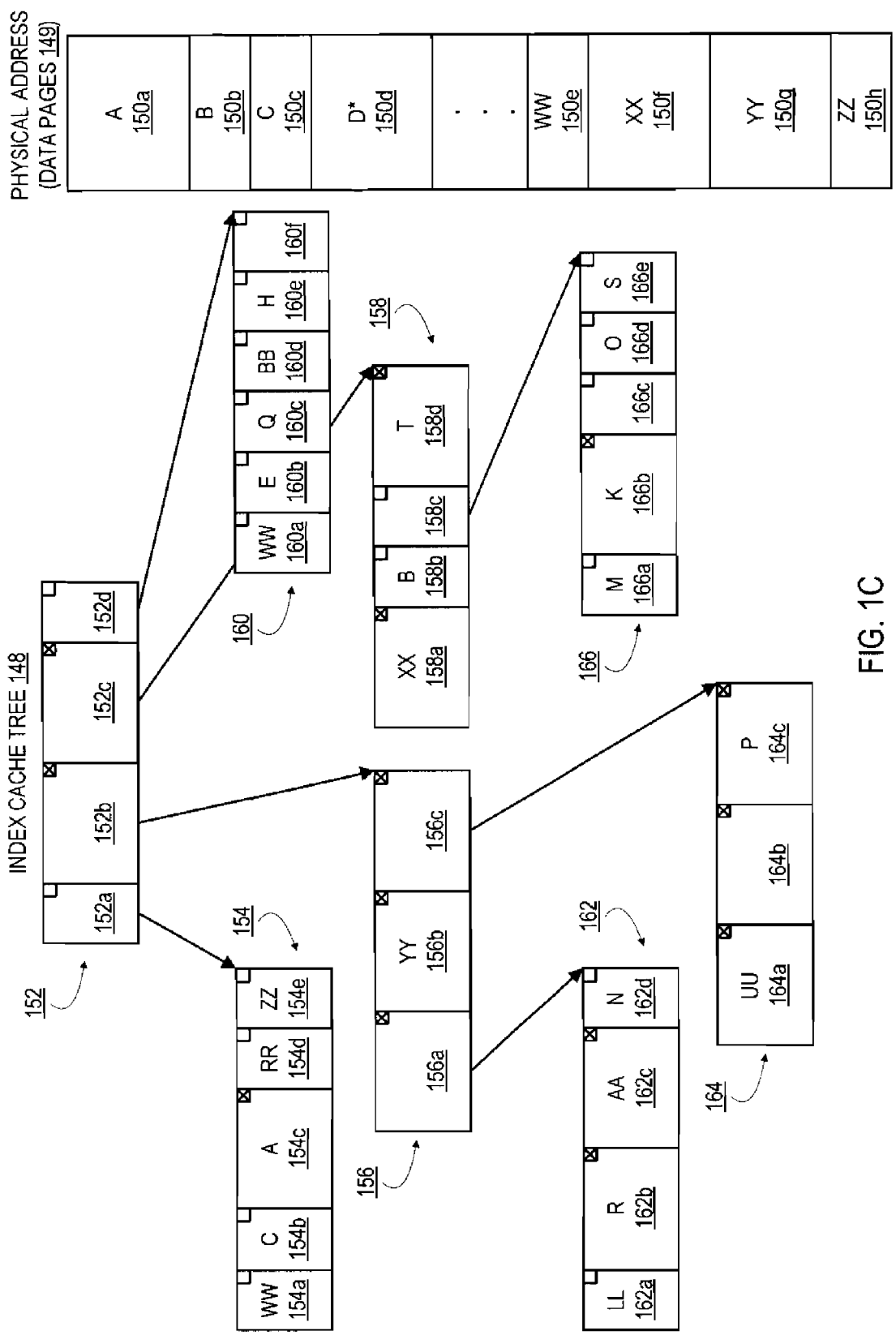

FIG. 1C is a block diagram illustrating another example mapping of logical sectors directly into physical data pages 149 using an example index cache tree 148. The index cache tree 148 is similar to the index cache trees 110 and 118, and the data pages 149 are similar to the data pages 108 and 119, as described above with regard to FIGS. 1A-1B. The depicted example index cache tree 148 demonstrates fixed size nodes, multi-tiered nodes, a file in the data pages 149 that is not listed in the index cache tree, gaps in the logical address offset sequence in index cache tree 148, and nodes having mixed entries with pointers and physical addresses.

The data pages 149 include multiple files A-ZZ 150a-h, each of which has a physical address. Similar to the index cache tree 118, the index cache tree 148 contains multiple nodes 152-166 and multiple entries 152a-d, 154a-e, 156a-c, 158a-d, 160a-f, 162a-d, 164a-c, and 166a-e. In the example index cache tree 148, long entries (e.g., entry 152b) are identified with an "X" flag in the upper right corner and short entries (e.g., entry 152a) have a blank box. In this example, the short entries are intended to be approximately half the length of the long entries (e.g., half the number of bits). As described above with regard to FIG. 1B, any ratio of short to long entries (e.g., 4-bytes to 6-bytes, etc.) can be used and/or any number of entry lengths can be used (e.g., 4 different entry lengths could be used).

The entries that contain a file 150a-h letter are intended to be representative of storing a physical address for the identified file. Although not depicted, logical page spans can also be present within each entry, similar to the description regarding logical page spans above with regard to FIG. 1B.

The depicted example index cache tree 148 demonstrates fixed size nodes, which means that each node is allocated the same amount of memory space within an index cache (e.g., index table cache 104). In the depicted example, each of the nodes 152-166 contains the same total length of entries (e.g., node 156 contains three long entries 156a-c, which in this example is the equivalent of the six short entries 160a-f contained in node 160). The amount of memory allocated for each node can be based on the spacing of data lines within a cache (e.g., each node can be allocated 24 bytes, 32 bytes, 64 bytes, 128 bytes, 512 bytes, 1024 bytes, etc.), or other alignments for volatile memory access efficiency. Such fixed memory allocation for each node can be cached memory that is used and divided efficiently.

The nodes 152-166 are multi-tiered. For instance, the node 152 has an entry 152b that points to the node 156, which in-turn has a node 156c that points to the node 164. Various node and element balancing and re-packaging techniques can be used to ensure optimal distribution of nodes and entries across the index cache tree 148.

The entries in each node can be mixed between storing a pointer and a physical address. For example, the node 158 contains three entries 158a-b and 158d that contain physical addresses and one entry 158c that contains a pointer.

The index cache tree 148 may not contain sufficient storage capacity to represent all of the logical address to physical address mappings contained in an index table in non-volatile memory (e.g., index table 106). For example, the file D 150*d* is not contained in the index cache tree 148.

The index cache tree 148 can contain gaps in the linear logical address offset that are represented by the entries. Such gaps can be represented by entries that contain a logical address span but do not contain a pointer or a physical page address (e.g., entries 164*b* and 166*c*). In such instances, the gap may cover the logical address offset for several files. For example, the entry 164*b* may cover the logical address offset corresponding to file D 150*d* and a file F (not depicted). Were a request for the logical to physical address mapping of the file D 150*d* to be received, then the entry 164*b* could be replaced, at least in part, with an entry corresponding to the file D 150*d*. Given the fixed size nature of the node 164, insertion of an entry corresponding to the file D 150*d* can result in deletion of another entry and/or node.

Other Example Data Structures in Volatile Memory

In some implementations, each entry of the index TOC 102 stores a physical address in non-volatile memory of an index table 106 entry and a pointer to an entry in the index table cache 104. The address 0xff or other suitable indicator can be placed in a index TOC 102 entry to indicate that a desired index table 106 entry is not stored in the index table cache 104.

In some implementations, the index table 106 can include a flat file structure that provides the logical address to physical address mappings. In other implementations, the index table 106 can include an index tree that provides compression of data entries, similar to the index cache trees 110, 118, and/or 148.

In some implementations, each entry of the index cache tree 110 can include but is not limited to: status data (e.g., clean, dirty, free), and/or a counter (e.g., a serial counter or count indicating how many times that particular block has been accessed).

The data structures described above are examples and other data structures can be used based on the application.

Example Read Operation

Figure 2A:
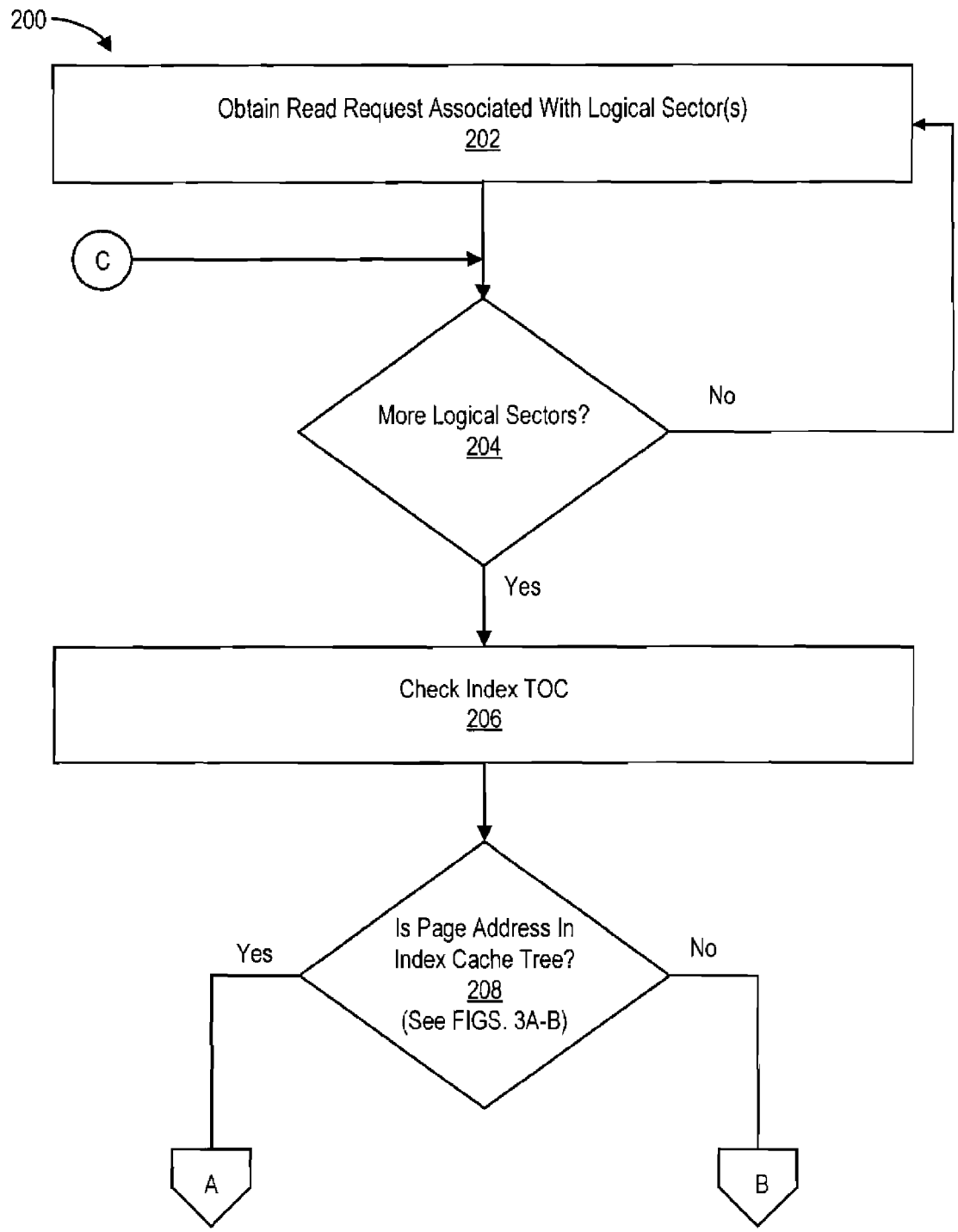
FIGS. 2A-2B are flow diagrams of an example read operation using the memory mapping architecture shown in FIGS. 1A-1C.
Figure 2B:
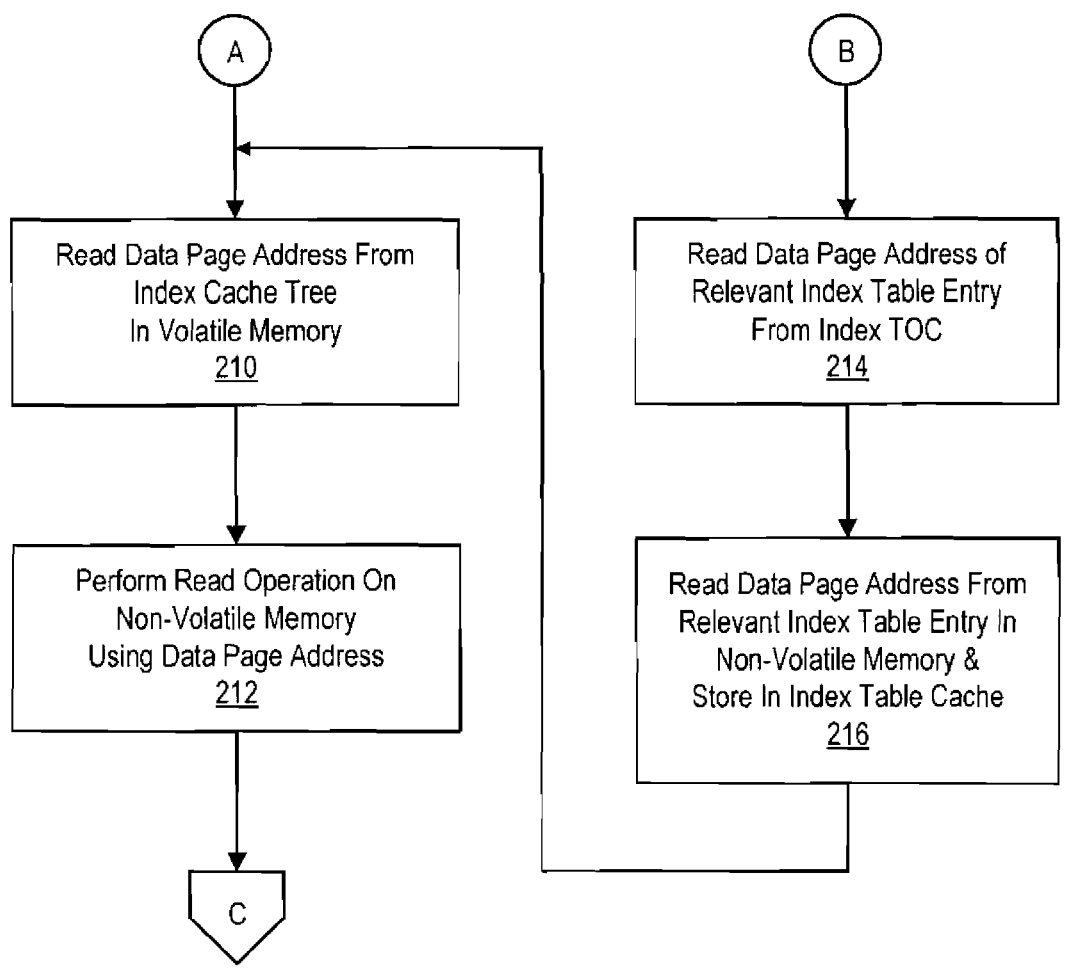

FIGS. 2A-2B are flow diagrams of an example read operation 200 using the memory mapping architecture shown in FIGS. 1A-1C.

Referring to FIG. 2A, in some implementations, the read operation 200 can begin by obtaining a read request associated with one or more logical sectors (202). For example, the read request can be issued by a file system. The read request can include a first sector number and a number of consecutive sectors. For each logical sector in the request (204), an index TOC (e.g., index TOC 102) in volatile memory is checked (206) to determine if a data page address associated with the current logical sector is stored in an index cache tree in volatile memory (e.g., index cache tree 110, 118, and 148). If the data page address is stored in the index cache tree (208), then the data page address is read from the index cache tree (210) and used to perform the read operation on non-volatile memory (212).

If the data page address is not stored in the index table cache (208), then the physical page address of the relevant index table entry storing the data page address is read from the index TOC (214), and the relevant index table entry storing the data page address is read from the index table entry and stored in the index table cache (216). The data page address can then be read from the index cache tree (210) and used to perform the read operation on non-volatile memory (212).

If more logical sectors need to be processed (204), then the foregoing steps are repeated until all logical sectors are processed for the read operation 200.

In some implementations, if during step 216 the index cache tree is full, older data page addresses in the index cache tree can be flushed to make room for newer data page addresses read from the index table in non-volatile memory. The flushing of the index cache tree can trigger unnecessary write operations on non-volatile memory. To avoid unnecessary write operations, an overflow buffer can be created in volatile memory and used to store the data page address read from the index table in non-volatile memory. The overflow buffer can be read to get the data page address for use in the read operation 200. Thus creating an overflow buffer in volatile memory can prevent unnecessary write operations to non-volatile memory during read operations.

Referring to FIG. 1A, the index TOC 102 in volatile memory contains information about the index table 106 that holds the physical page address of the data page 108 to be read. At least a portion of the index table 106 can be stored in the index cache tree 110 in volatile memory or stored in an index block in non-volatile memory. If the index table 106 is stored in the index cache tree 110, the index table 106 can be read from the index cache tree 110 and used to find the physical address of the data page 108 to be read in non-volatile memory. If the index table 106 is not stored in the index cache tree 110, then the data page address can be read from the relevant entry of the index table 106 in non-volatile memory and inserted into the index cache tree 110. The data page address can be read from the index cache tree 110 and used to perform the read operation on the data page 108 in non-volatile memory.

In some implementations, the read operation 200 gets a logical sector number (Lpn) and a number of consecutive logical sectors to read. The read operation 200 maps the logical sector number into physical locations in the non-volatile memory. Assuming a page size of 2 KB, some example steps for the read operation 200 can be described using pseudo code as follows:

Step 1: indexPage=readPhysicalPage (TOC[Lpn/512])
Step 2: dataBuffer=readPhysicalPage (indexPage[Lpn %512])
Step 3: return dataBuffer, where readPhysicalPage is a function that returns a pointer to a physical page, TOC[ ] and indexPage[ ] are arrays for storing TOC entries and indexPage entries, respectively, and 512 is the number of data pages that are mapped by an index table entry (512*4 bytes=2 KB). In this example, the type indexPage holds the starting address (pointer) of the index table and the type dataBuffer holds the starting address (pointer) of the data pages that correspond to the logical sector number Lpn to be read.

Example Technique for Locating an Entry in an Index Cache Tree

Figure 3A:
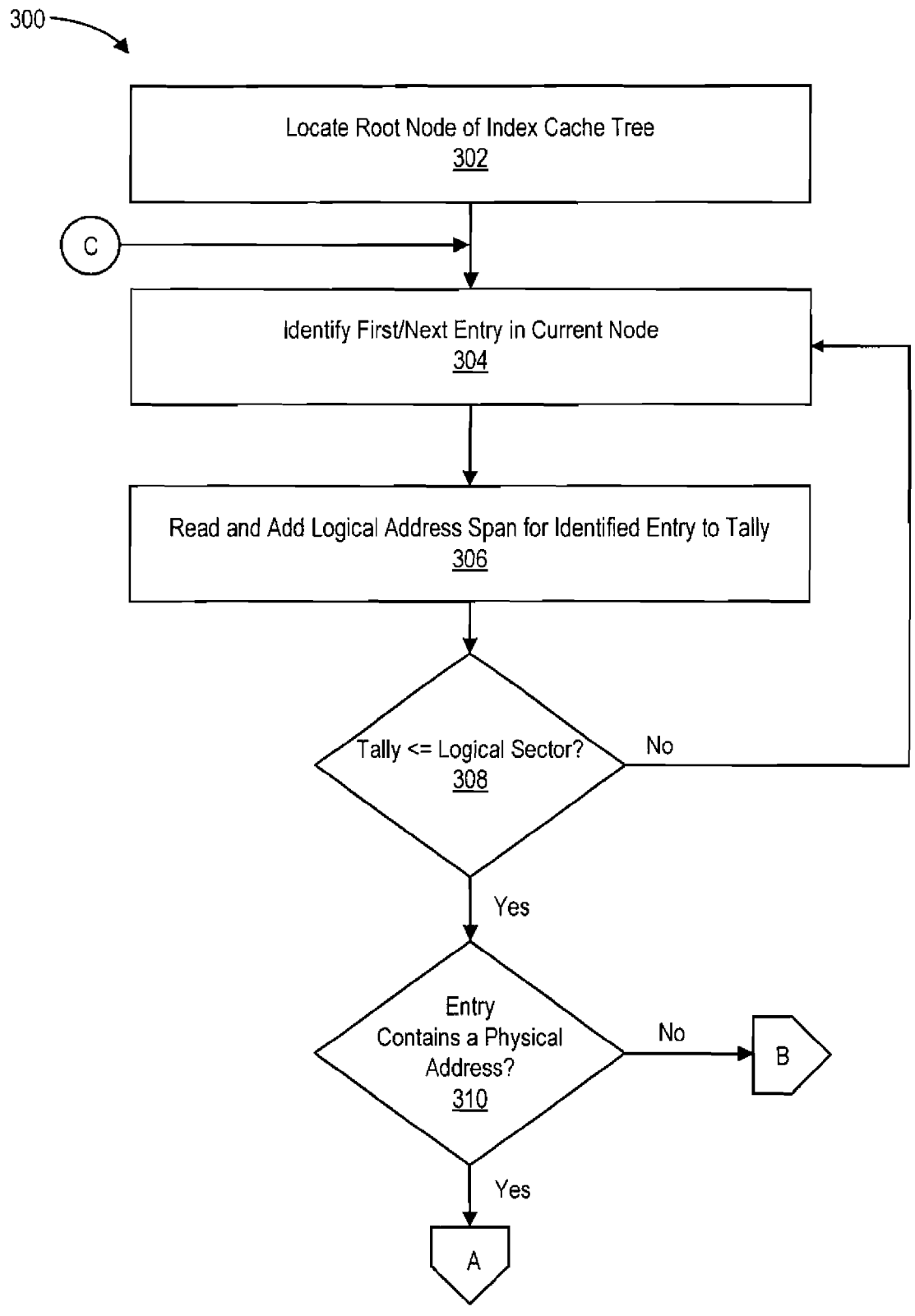
FIGS. 3A-3B are flow diagrams of an example operation for locating an entry in an index cache tree using the memory mapping architecture of FIGS. 1A-1C.
Figure 3B:
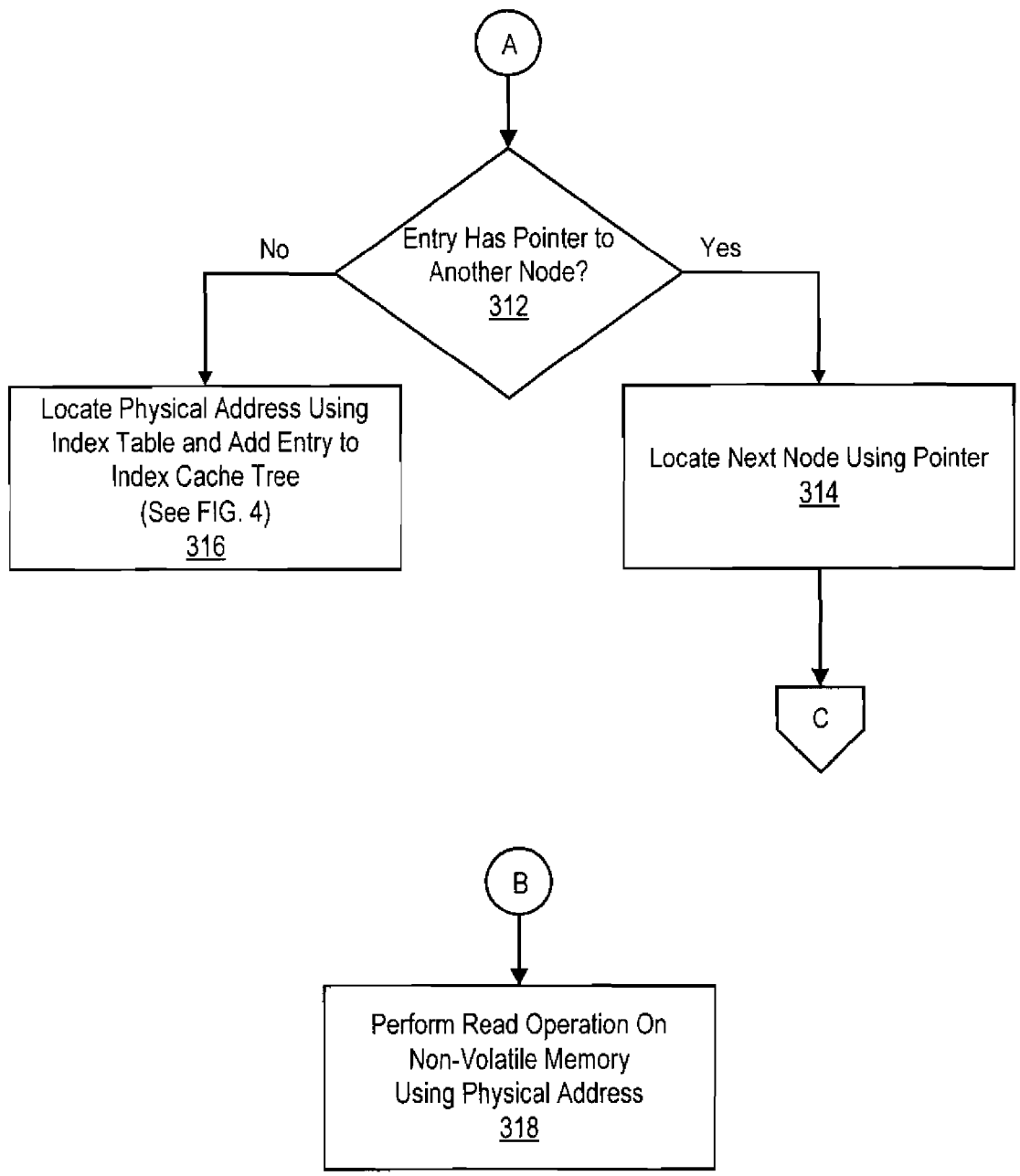

FIGS. 3A-3B are flow diagrams of an example operations 300 for locating an entry in an index cache tree using the memory mapping architecture of FIGS. 1A-1C.

Referring to FIGS. 3A and 3B, in some implementations the operation 300 can begin by locating a root node of an index cache tree (302). For example, the root node 124 of the index cache tree 118 or the root node 152 of the index cache tree 148 can be located, as described with reference to FIGS.

1B-1C. The root node can be located in response to receiving a read request, such as at step 208 in response to the read request 202 described with regard to FIGS. 2A-2B. The first entry of the root node (e.g., the current node being evaluated) is identified (304). For example, the first entry 126a of the root node 124 is identified. The logical address span for the identified entry is read and added to a tally (306). As described above with reference to FIG. 1B, the tally corresponds to the logical address offset for the entry. The tally can be initialized before the logical address span from the identified entry is added, as described with reference to FIG. 1B. The logical sector, such as the logical sector obtained with a read request (202), is compared against the tally (308). If the logical sector is not greater than or equal to the tally (308), then the next entry in the current node is identified (304), as described above with regard to FIG. 1B.

If the logical sector is greater than or equal to the tally (308), then the identified entry is determined to correspond to the logical sector. If the identified entry contains a physical address (310), then a read operation is performed on non-volatile memory using the physical address contained in the entry (318), such as the read operation described with regard to FIG. 2B. If the identified entry does not contain a physical address, then a determination is made as to whether the identified entry contains a pointer to another node (312). If the identified entry does have a pointer to another node, then a next node indicated by the pointer is identified (step 314). Using the located next node, the first entry of the next node is identified (304), the logical address span for the identified entry is added to the tally (306), and the tally is compared to the logical sector (308), as described above with regard to FIG. 1B.

If the identified entry does not contain a pointer to another node (312), then the physical address for the logical sector can be located using the index table in non-volatile memory (e.g., index table 106) (314). Additionally, the identified physical address for the logical sector can be added as an entry to the index cache tree (e.g., index cache trees 110, 118, and 148), as describe in further detail with regard to FIG. 4.

The nodes and entries of an index cache tree can be located, added to the tally, and compared against the logical sectors until either the identified entry contains a physical address (318) or the identified entry does not contain either a physical address or a pointer to another node (316), such as entry 164b of node 164 described above with regard to FIG. 1C.

Example Operation for Adding an Entry to an Index Cache Tree

Figure 4:
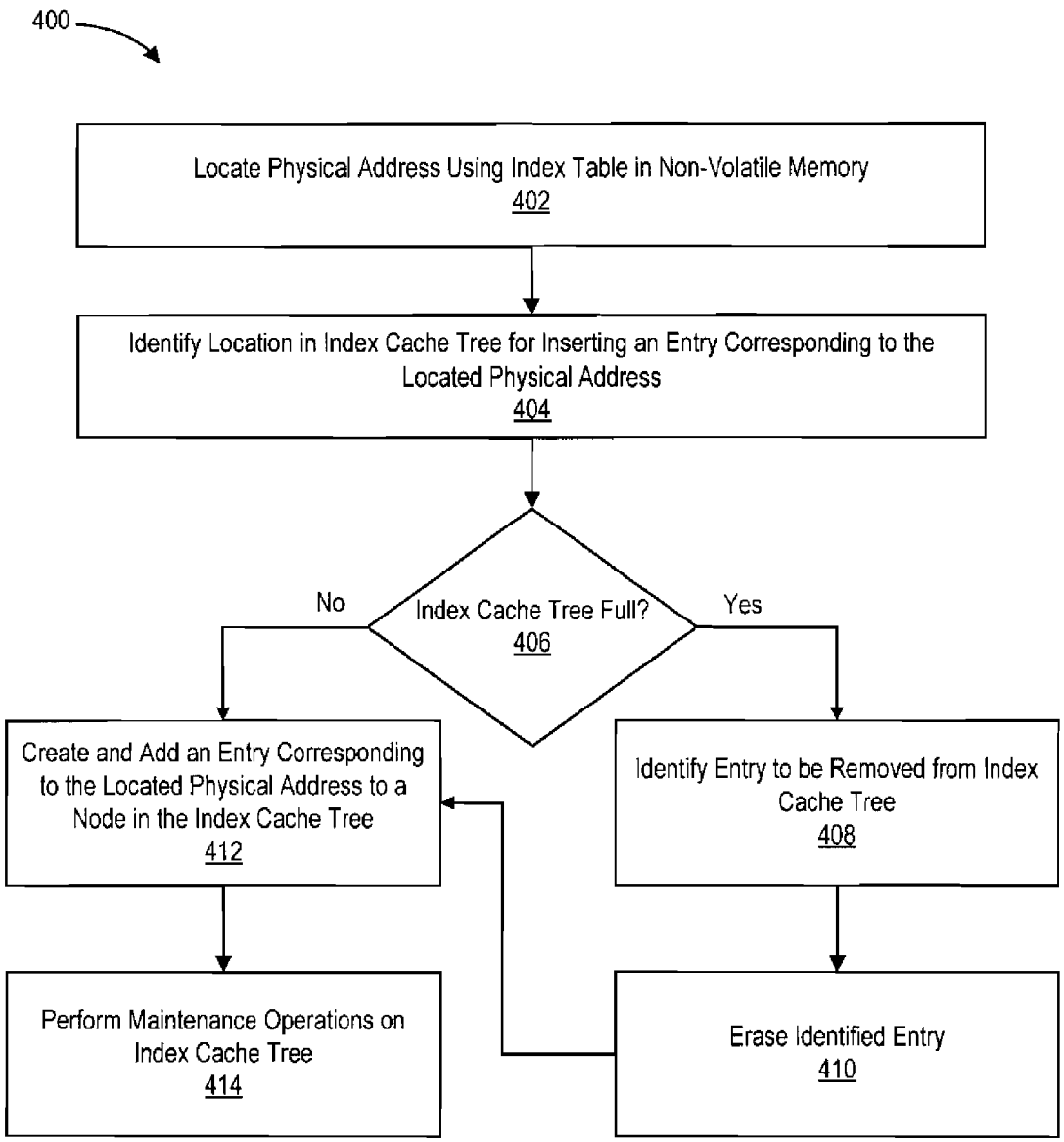
FIG. 4 is a flow diagram of an example operation for adding an entry to an index cache tree using the memory mapping architecture of FIGS. 1A-1C.

FIG. 4 is a flow diagram of an example operation 400 for adding an entry to an index cache tree using the memory mapping architecture of FIG. 1A-1C. The operation 400 can be used to add an entry mapping a logical address to physical address for a logical sector that is not represented in an index cache tree. The operation 400 can be performed after a logical address to physical address is retrieved from non-volatile memory, such as at steps 216 and 316, as described with regard to FIGS. 2B and 3B.

The physical address for a logical sector that is not represented in an index cache tree is located in non-volatile memory using an index table (e.g., index table 106) (402). A location in the index cache tree is located for inserting an entry that corresponds to the physical address located from the non-volatile memory (404). An operation similar to the operation 300 can be performed to locate an appropriate node and entry where the physical address located from non-volatile memory can be added. For example, the appropriate location may be an entry, such as entries 164a and 166b described with regard to FIG. 1C, that contains a logical address span without a pointer or physical address.

If the index cache tree is full (406), then an entry (or possibly a node) can be identified to be removed from the index cache tree (408). A variety of techniques can be used to identify an entry or node to remove from the index cache tree. For instance, in some implementations the oldest entry (e.g., the least recently added to the index cache tree) is removed from the index cache tree. In other implementations the least recently accessed entry can be removed. In some implementations, the data structure may be divided into multiple trees, and the tree(s) with the highest memory usage may be removed. Information regarding the age and accesses of an entry in the index cache tree, and size of the tree(s), can be obtained from metadata associated with the index cache tree and stored in volatile memory (e.g., a counter for an entry, etc.).

The entries (or nodes) identified to be removed from the index cache tree is erased from the index cache tree (410). An entry corresponding to the located physical address is created and added to a node in the index cache tree (412) at the identified location (e.g., the location identified at step 404). Maintenance operations are performed on the index cache tree (414). Maintenance operations can include balancing and re-packing the index cache tree so that a near even distribution of entries and nodes is achieved, and wasted space is minimized. When balancing the index cache tree, logical address spans for parent entries (e.g., entries that contain a pointer to another node, such as entry 126a from FIG. 1B) may need to be readjusted since they are based upon the logical address spans of their children nodes. A variety of tree balancing and re-packing techniques known in the art can be used.

Example Memory Subsystems

Figure 5A:
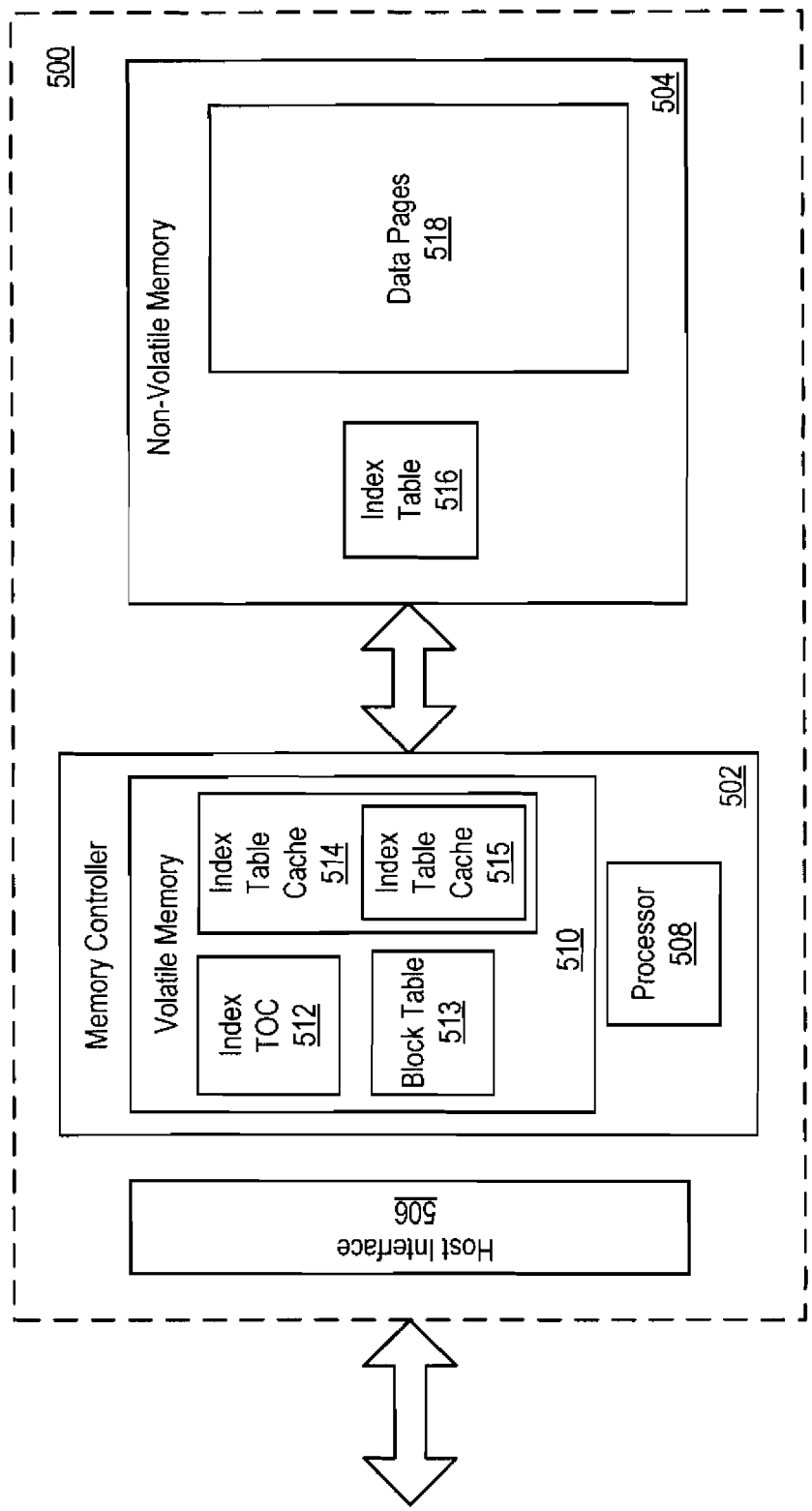
FIG. 5A is a block diagram of example memory subsystem for implementing the memory architecture and operations of FIGS. 1-4.

FIG. 5A is a block diagram of example memory subsystem for implementing the memory architecture and operations of FIGS. 1-4. In some implementation, the subsystem 500 can include a controller 502, non-volatile memory 504 and host interface 506. The controller 502 can include volatile memory 510 (e.g., RAM) and processor 508. The volatile memory 510 stores a block TOC 512, a block table 513 and an index table cache 514. The index table cache 514 can employ an index cache tree 515 (e.g., index cache trees 110, 118, and 148) to perform the operations described above. The volatile memory 510 can be configured dynamically by the processor 508 based on availability and any other suitable factors. The non-volatile memory 504 can include an index table 516 and data pages 518. The subsystem 500 can include other components that have been omitted from FIG. 5 for clarity.

In operation, the host interface 506 can obtain read/write requests from a host system over a bus (e.g., IDE/ATT). The host interface 506 can include circuitry and software for receiving data, addresses and control signals. The read/write requests can include a logical sector number and a number of consecutive logical sectors to read/write.

The processor 508 can access the volatile memory 510 and read the index TOC 512 to determine if the index table cache 514 includes physical addresses for the logical sector. More specifically, the processor 508 can use the index cache tree 515 (e.g., index cache trees 110, 118, and 148) to determine if the physical addresses for the logical sectors are included in the index table cache 514. If the index cache tree 515 includes the physical addresses, then the physical addresses are used for the read/write operation. If the index cache tree 515 does not include the physical addresses, then the processor 508 accesses volatile memory 510 to read the index TOC 512 to get the page address of the index table 516 in the non-volatile memory 504. The processor 508 can use the physical addresses in the index table 516 to perform a memory mapping to data pages 518 during the read/write operation.

In some implementations, the data pages 518, index TOC 512 and/or index table 516 can be implemented on one or more different memory devices.

Figure 5B:
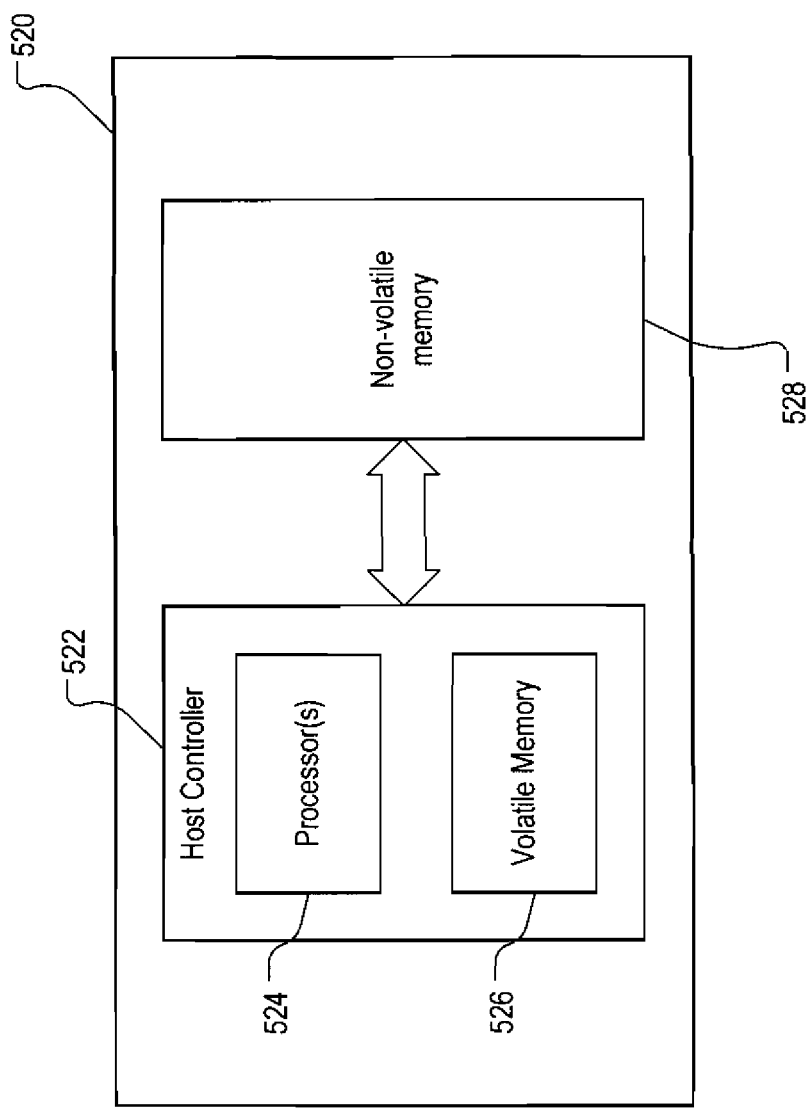
FIG. 5B is a block diagram illustrating the system architecture of an example device including a memory subsystem for implementing the memory architecture and operations of FIGS. 1-4.

FIG. 5B is a block diagram illustrating an example device 520 including a memory subsystem for implementing the memory architecture and operations of FIGS. 1-4. In some implementations, the device 520 is a portable device, such as a media player device, a personal digital assistant, a mobile phone, portable computers, digital cameras, and so on, for example.

The device 520 includes a host controller (or a so-called "System-on-Chip" or "SoC") 522 and non-volatile memory 528. The device 520 can optionally include additional memory external to the host controller 522 and the non-volatile memory 528. The host controller 522 includes one or more processors 524 and volatile memory 526. In some implementations, volatile memory 526 is static random-access memory (SRAM). The host controller 522 performs various processing operations and input/output operations, including the operations described in reference to FIGS. 2-4. For example, the host controller 522 can receive and process user inputs, generate outputs, perform media (e.g., audio, video, graphics) decoding and processing operations, other processing operations, and so on. The host controller 522 can read data from and write data to volatile memory 526. The host controller 522 can also issue read or write operations to the non-volatile memory 528 through an interface (not shown). In some implementations, requests for data can be issued by and/or received by the host controller 522. For instance, the host controller 522 can issue a request for data contained in the non-volatile memory 528. The issued request can be received by the host controller 522 and a logical address for the requested data can be resolved to a physical address using an index cache tree, as described above with reference to FIGS. 1-4.

In some implementations, the non-volatile memory 528 is NAND flash memory. In some other implementations, the non-volatile memory 528 is another type of non-volatile memory, such as NOR flash memory, other types of solid state memory, or a hard disk drive, for example. The device 520 can also include one or more other components that have been omitted from FIG. 5B for clarity.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving a request for data associated with a logical address, where the logical address corresponds to a physical address of the requested data in non-volatile memory;
   accessing an index cache tree that contains compressed data comprising a predefined number of most recently accessed mappings between logical addresses to physical addresses of data in the non-volatile memory, wherein the predefined number of mappings comprises a subset of all logical address to physical address mappings for the non-volatile memory;
   translating the associated logical address into the corresponding physical address by traversing the accessed index cache tree and aggregating at least a portion of the compressed data to represent the associated logical address; and
   returning the corresponding physical address of the requested data in non-volatile memory.

2. The method of claim 1, wherein the index cache tree is located in volatile memory.

3. The method of claim 1, wherein the index cache tree is located in non-volatile memory.

4. The method of claim 1, wherein the index cache tree contains a plurality of nodes organized into a hierarchical structure and wherein each node contains a plurality of entries.

5. The method of claim 4 wherein, for each of the plurality of entries, the compressed data comprises a logical address span contained in the entry that corresponds to a length of an associated memory segment.

6. The method of claim 4 wherein, for each of the plurality of entries, the compressed data comprises a flag contained in the entry that indicates a predetermined length for the entry.

7. The method of claim 6, wherein the flag is one or more bits of an entry.

8. The method of claim 4, wherein each of the plurality of entries includes at least one of:
   a pointer to a node,
   a physical address corresponding to a memory segment, and
   an indicator that the requested physical address is not contained in the index cache tree.

9. The method of claim 4 further comprising:
   starting at a root node of the index cache tree; and
   identifying an entry of the root node that corresponds to the associated logical address by sequentially aggregating logical address spans of the entries of the root node until an aggregate logical address span corresponds to the associated logical address.

10. The method of claim 9, wherein the identified entry of the root node contains a pointer to a second node of the index cache tree.

11. The method of claim 10, further comprising identifying an entry of the second node that corresponds to the associated logical address by sequentially adding logical address spans of the entries of the second node to the aggregate logical address span until the aggregate logical address span corresponds to the associated logical address, wherein the identified entry of the second node contains the physical address for the memory segment.

12. A system comprising:
   non-volatile memory storing data that is associated with physical addresses; and
   a controller coupled to the non-volatile memory, wherein the controller is configured to receive a request for data associated with a logical address, where the logical address corresponds to a physical address of the requested data in the non-volatile memory, and wherein the controller is further configured to determine the corresponding physical address by:
   accessing an index cache tree that contains compressed data comprising a predefined number of most recently accessed mappings between logical addresses to physical addresses of data in stored in the non-volatile memory, wherein the predefined number of mappings comprises a subset of all logical address to physical address mappings for the non-volatile memory; and by translating the associated logical address into the corresponding physical address using the accessed index cache tree, where the associated logical address is translated into the corresponding physical address by traversing the accessed index cache tree and aggregating at least a portion of the compressed data to represent the associated logical address.

13. The system of claim 12, further comprising volatile memory storing the index cache tree.

14. The system of claim 12, wherein the index cache tree is stored in the non-volatile memory.

15. The system of claim 12, wherein the index cache tree contains a plurality of nodes organized into a hierarchical structure and wherein each node contains a plurality of entries.

16. The system of claim 15 wherein, for each of the plurality of entries, the compressed data comprises a logical address span contained in the entry that corresponds to a length of an associated memory segment.

17. The system of claim 15, wherein, for each of the plurality of entries, the compressed data comprises a flag contained in the entry that indicates a predetermined length for the entry.

18. A method comprising:
receiving a request for data associated with a logical address, where the logical address corresponds to a physical address of the requested data in non-volatile memory;
accessing an index cache tree that contains compressed data comprising a predefined number of most recently accessed mappings between logical addresses to physical addresses of data in the non-volatile memory, wherein the predefined number of mappings comprising a subset of all logical address to physical address mappings for the non-volatile memory, the index cache tree comprises a plurality of nodes organized into a hierarchical structure, where each of the plurality of nodes comprises a plurality of entries and each entry includes a logical address span and either a pointer to a node or a physical address corresponding to the logical address span;
translating the associated logical address into the corresponding physical address of the requested data in the non-volatile memory based upon a physical address stored in an entry of the index cache tree identified as corresponding to the associated logical address; and
returning the identified physical address for the memory segment.

19. The method of claim 18, wherein translating the associated logical address into the corresponding physical address further comprises:
starting at a root node of the index cache tree, identifying an entry of the root node that corresponds to the associated logical address by sequentially aggregating logical address spans of the entries of the root node until an aggregate logical address span corresponds to the associated logical address, wherein the identified entry of the root node contains a pointer to a second node of the index cache tree.

20. The method of claim 19, wherein translating the associated logical address into the corresponding physical address further comprises:
identifying an entry of the second node that corresponds to the associated logical address by sequentially adding logical address spans of the entries of the second node to the aggregate logical address span until the aggregate logical address span corresponds to the associated logical address, wherein the identified entry of the second node contains the physical address of the requested data in non-volatile memory.

21. The method of claim 18, wherein a length of each entry comprises a first number of bits in length or second number of bits in length based upon the logical address span for the entry, and wherein entries of a node are sequentially ordered from least significant logical address to most significant logical address.

* * * * *